(12) United States Patent
Hämäläinen

(10) Patent No.: US 7,664,047 B2
(45) Date of Patent: *Feb. 16, 2010

(54) METHOD FOR DETERMINING WHETHER TO PEFORM LINK ADAPTATION IN WCDMA COMMUNICATIONS

(75) Inventor: Seppo O. Hämäläinen, Espoo (FI)

(73) Assignee: Nokia Corporation, Espoo (FI)

( * ) Notice: Subject to any disclaimer, the term of this patent is extended or adjusted under 35 U.S.C. 154(b) by 564 days.

This patent is subject to a terminal disclaimer.

(21) Appl. No.: 11/399,291

(22) Filed: Apr. 5, 2006

(65) Prior Publication Data

US 2006/0256732 A1 Nov. 16, 2006

Related U.S. Application Data

(63) Continuation of application No. 09/912,227, filed on Jul. 24, 2001, now Pat. No. 7,027,420.

(51) Int. Cl.
*H04J 1/16* (2006.01)
*H04B 7/216* (2006.01)

(52) U.S. Cl. .................. 370/252; 370/441; 370/335

(58) Field of Classification Search ............. 370/252, 370/335, 342, 441, 465, 468, 249, 328, 329, 370/332, 333

See application file for complete search history.

(56) References Cited

U.S. PATENT DOCUMENTS

| | | | | |
|---|---|---|---|---|
| 6,085,108 A | 7/2000 | Knutsson et al. | ............. | 455/522 |
| 6,163,705 A | 12/2000 | Miya | ............ | 455/522 |
| 6,212,399 B1 | 4/2001 | Kumar et al. | ............... | 455/522 |
| 6,215,827 B1 | 4/2001 | Balachandran et al. | ...... | 375/262 |
| 6,373,878 B1 * | 4/2002 | Palenius et al. | ............. | 375/136 |
| 6,639,934 B1 | 10/2003 | Engstrom et al. | ........... | 375/130 |
| 6,643,322 B1 | 11/2003 | Varma et al. | ................ | 375/227 |
| 7,349,463 B1 * | 3/2008 | Pajukoski et al. | ........... | 375/148 |
| 2002/0080719 A1 * | 6/2002 | Parkvall et al. | ............. | 370/235 |
| 2003/0003920 A1 | 1/2003 | Sebastian | .................... | 455/452 |

FOREIGN PATENT DOCUMENTS

| | | |
|---|---|---|
| CN | 1175869 | 3/1998 |
| EP | 0 797 327 | 9/1997 |
| EP | 0 823 793 | 2/1998 |
| EP | 1 161 010 | 12/2001 |
| JP | 2000-49663 | 2/2000 |

* cited by examiner

*Primary Examiner*—Brian D Nguyen
(74) *Attorney, Agent, or Firm*—Ware, Fressola, Van Der Sluys & Adolphson LLP

(57) ABSTRACT

An apparatus and corresponding method for deciding whether to perform link adaptation for communication transmitted from a first communication device to a second communication device, where the second communication device examines a signal received from the first communication device and provides a first indication of the quality of the signal. The method includes the steps of: recording at least one first indication of the quality of the signal as received by the second communication device; providing a second indication of the quality of the signal based on the at least one first indication of the quality of the signal; and deciding to perform link adaptation based on the second indication of the quality of the signal. The first indication of the quality of the signal is for example a signal to interference ratio (SIR) estimate. Often, the second indication of the quality of the signal is a changed SIR target value.

14 Claims, 6 Drawing Sheets

METHOD FOR DETERMINING WHETHER TO PEFORM LINK ADAPTATION IN WCDMA COMMUNICATIONS

CROSS REFERENCE TO RELATED APPLICATIONS

This application is a continuation of U.S. patent application Ser. No. 09/912,227 filed Jul. 24, 2001 now U.S. Pat. No. 7,027,420 issued Apr. 11, 2006, from which priority is claimed under all applicable sections of Title 35 of the United States Code including, but not limited to, Sections 120, 121, and 365(c).

FIELD OF THE INVENTION

The present invention relates to wideband code division multiple access (WCDMA) communication. More particularly, the invention relates to the use of link adaptation in WCDMA mobile phone communications.

BACKGROUND OF THE INVENTION

In the so-called HSPA (High Speed Packet Access) method of wideband code division multiple access (WCDMA) mobile phone communication, a number of different coding rates can be used. In addition, multi-level modulation can be used. Link adaptation is a method in which modulation and coding schemes by which a base station communicates with a user are adaptively selected based on the existing signal conditions being experienced by the user of the cellular communication system. By using link adaptation, an appropriate coding rate and modulation level (number of bits transmitted per signaling period) can be selected for each user. For example, in ordinary quaternary phase shift (QPSK) modulation, one can transmit two bits per phase transition, using four constellation points, with the amplitude remaining constant. With 8 PSK, there are eight constellation points, making possible transmitting three bits per transition. With quadrature amplitude modulation (QAM), the amplitude can also be changed. For example, using 16 QAM, there are four possible phase values and four possible amplitudes leading to sixteen constellation points.

The prior art teaches changing coding and modulation based on a pilot signal level indicating a S/N ratio (i.e. the coding and modulation being changed based on a S/N measurement of the pilot signal). In response to an indication of a poor S/N ratio, the prior art teaches as one response changing to a lower modulation level or to stronger coding (more robust) and conversely in response to an indication of a good S/N ratio.

One problem with the prior art solution is that the pilot signal measurement includes several sources of error, and the algorithm used in the prior art to decide on what link adaptation to make (if any) does not work particularly well because of the many possible errors. For example, the algorithm may select the wrong modulation and coding set (MCS) if there is error in the pilot S/N measurement (or other similar measurements, such as an Ec/IO or Eb/IO measurement, which are both measurements made on the common pilot channel, CPICH, Ec/IO standing for energy per chip to interference ratio, and Eb/NO standing for energy per bit to interference ratio), or in case of an error in the prior art measurement of the HS-DSCH channel quality instead of the common pilot channel (CPICH) quality.

What is needed is a robust and fast link adaptation methodology for use by a mobile phone communicating via a wireless communication system allowing coding rate and modulation level to be changed. In some communication systems, such as HSDPA, a fixed power level is used for HS-DSCH, but for other the power level varies. Ideally, what is needed in general (for systems other than HSDPA) is a methodology that is not limited to use when the mobile phone is transmitting at either its maximum or minimum power level, but one that can be used when the mobile phone is transmitting also at any intermediate power level.

SUMMARY OF THE INVENTION

Accordingly, the present invention provides an apparatus and corresponding method for deciding whether to perform link adaptation for communication from a first communication device to a second communication device, i.e. for communication signals being transmitted from the first communication device to the second communication device, the second communication device examining a signal received from the first communication device and providing a first indication of the quality of the signal as received by the second communication device, an indication such as a signal to interference ratio (SIR) estimate, the method including the steps of: recording at least one first indication of the quality of the signal as received by the second communication device; providing a second indication of the quality of the signal (such as an SIR target value provided by what is often called an outer power control loop) based on the at least one first indication of the quality of the signal; and deciding to perform link adaptation based on the second indication of the quality of the signal (the decision based for example on a history of the SIR target values received from the outer power control loop).

In a further aspect of the invention, the first indication of the quality of the signal as received by the second communication device is a SIR estimate, as mentioned above, or an acknowledgment/negative acknowledgment (ACK/NACK) signal.

In another further aspect of the invention, the second indication of the quality of the signal as received by the second communication device is either an SIR target value, a changed SIR target value, an ACK/NACK signal, or a signal derived from a series of consecutive ACK/NACK signals. In some applications according to this aspect of the invention, the decision to perform link adaptation is based on whether the SIR target is to be changed to a value that is within some predetermined margin of a predetermined maximum or minimum SIR target. In some applications according to this aspect of the invention, a succession of SIR target change commands are recorded, and the decision to perform link adaptation is based on whether a predetermined number of consecutive SIR target change commands are all either to increase the SIR target or to decrease the SIR target. In some applications according to this aspect of the invention, a succession of SIR target change commands are recorded, and the decision to perform link adaptation is based on whether a predetermined fraction of a predetermined number the SIR target change commands are either to increase the SIR target or to decrease the SIR target.

In still another aspect of the invention, the first communication device is selected from the group consisting of a mobile station and a base station and the second communication device is the other device in the group consisting of a mobile station and a base station.

In still yet even another aspect of the invention, the first communication device or the second communication device perform one or more of the steps of recording at least one first indication of the quality of the signal, providing a second indication of the quality of the signal, and deciding to perform link adaptation.

In yet still even another aspect of the invention, a radio network controller (RNC) performs one or more of the steps of recording at least one first indication of the quality of the signal, providing a second indication of the quality of the signal, and deciding to perform link adaptation.

In even still yet another aspect of the invention, the signal for which the indication of the quality of the signal as received by the second communication device is used as a basis for a link adaptation decision is different from, but associated with, the signal for which the link adaptation decision is made.

In yet still even another aspect of the invention, the first indication of the quality of the signal as received by the second communication device is a frame error rate (FER) or block error rate (BLER) or corresponding statistic collected over a predetermined time period.

The method of the invention has as one advantage that it is not susceptible to measurement errors since no measurements are made, the method relying on quality indicators, such as CRC checks, instead of SIR measurements.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention as described here is concerned with link adaptation to improve the quality of a downlink (from a base station to a mobile), but it should be understood that the invention can also be used to improve the quality of an uplink (from a mobile to a base station). The roles of the mobile and the base station (or other network elements) are merely reversed.

Figure 1:
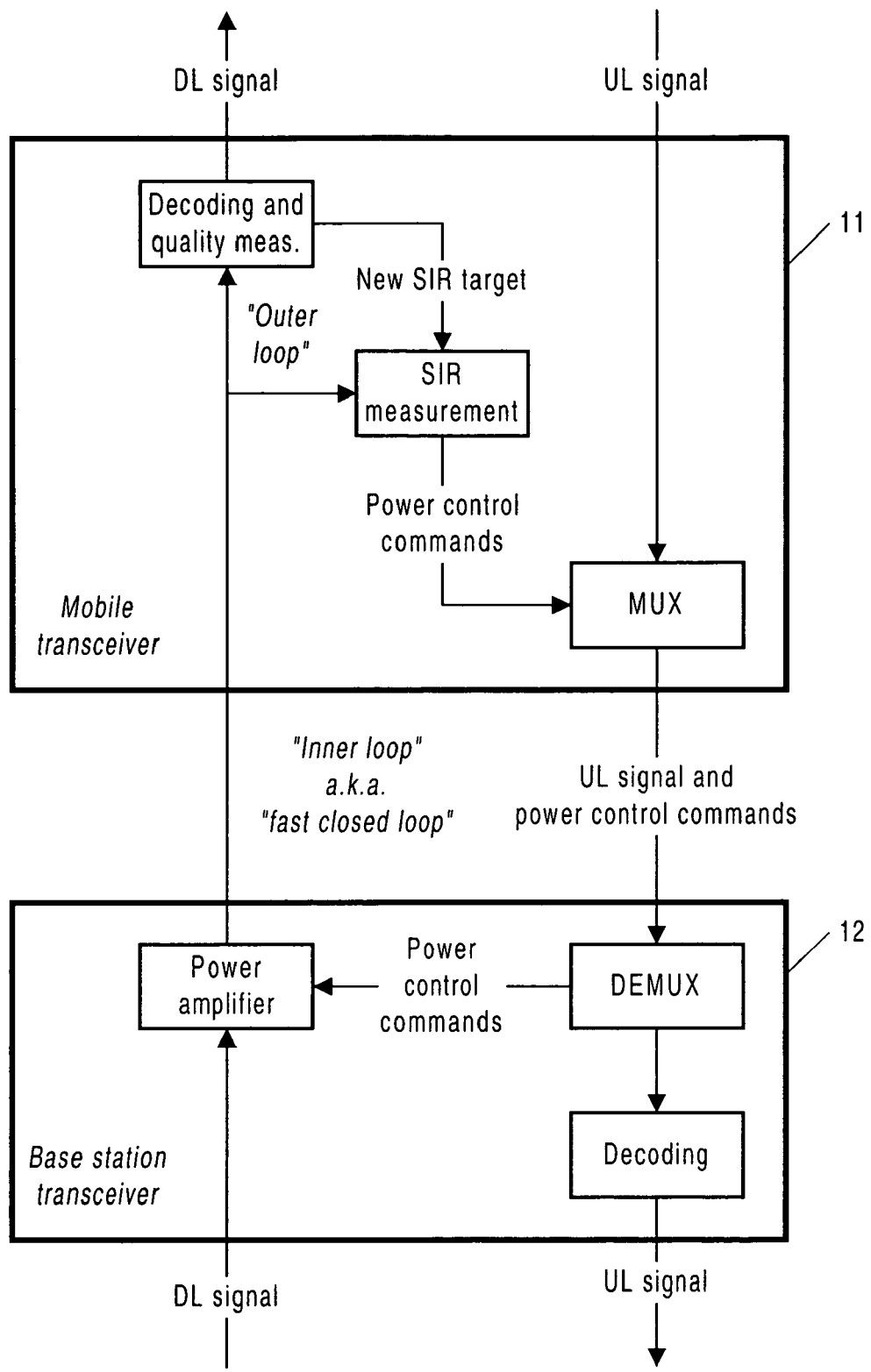
FIG. 1 is a block diagram/flow diagram indicating the well-known downlink closed loop power control, which provides information used by the invention to determine whether or not to have a mobile perform link adaptation.

According to the invention, to improve the quality of a downlink, a base station performs link adaptation (changing baseband coding or the modulation level used) in communicating with a mobile station using wideband code division multiple access (WCDMA) based on the output of the well known (downlink) outer-loop power control process, one element of the downlink closed-loop power control process. There is both uplink and downlink power control, i.e. both the UE and the base station adjust transmit power to some target value. (The base station serving a set of mobiles, each on a different channel, adjusts the transmit power for each channel to some target value.) For downlink power control, the quality measurements (i.e. quality monitoring, via quality indicators) used to determine how to adjust the transmit power for transmitting to the mobile are performed in the mobile. Outer loop power control can be made in the mobile or in the radio network controller (RNC) for the serving base station based on information passed to the RNC via the serving base station. Outer loop power control can also be made in the base station based on information passed to it by the mobile. Referring now to FIG. 1, in the inner loop (also known as the fast power control loop), a downlink (DL) signal arriving at the mobile station transceiver 11 is tapped by a module for performing signal to interference ratio (SIR) measurements (or some equivalent measurement). The SIR measurement module compares the SIR of the DL signal to an SIR target, and based on the comparison, issues a power control command to the serving base station transceiver 12 to increase or decrease transmit power. The power control commands are multiplexed with the uplink signal and so transmitted to the base station transceiver 12. The demultiplexer of the base station transceiver extracts the power control commands and provides them to its power amplifier. In the outer loop (also known as the slow power control loop), the downlink signal is examined by a decoding and quality measurement module, which determines whether or not to adjust the SIR target used by the SIR measurement module to determine which power control commands to issue. The decision whether to adjust the SIR target is based on a bit error rate or frame error rate or some other measure of frame reliability. A common way of determining whether to increase or decrease the SIR target is to simply check whether the received frame or TTI (transmission time interval) had errors. This can be done for example by using CRC checks.

Although a fast power control loop (the so-called inner loop) is shown and described in FIG. 1, the invention in no way makes use of a fast power control loop. The invention makes use only of either SIR target increase or decrease commands provided by the outer loop, also called the slow power control loop, or ACK/NACK signaling, as described below.

Now, according to the invention in the preferred embodiment, link adaptation is performed by the mobile (i.e. the coding/modulation level is changed) in each of the following events.

1) The SIR target reaches a predetermined maximum or minimum value.

2) The SIR target is some predetermined amount below (above) a maximum (minimum) SIR target.

3) A predetermined change (positive or negative) in the SIR target is detected.

4) A predetermined percentage of some predetermined most recent SIR target commands are commands to alter (increase or decrease) the SIR target used by the base station.

In the specific application being described here, i.e. improving the quality of the downlink, it is the mobile station (or the RNC or the base station) that knows the SIR target and how it has changed. If the outer loop power control is made in the network (in the RNC or in the base station) the base station (or the RNC) can signal to the mobile either each new SIR target and the mobile can then decide what specific link adaptation to make (when any of the above events occur), or the base station (or the RNC) can determine what link adaptation the mobile should make and so signal the mobile. If the outer loop power control is made in the mobile station, no signaling is needed, but the mobile station already has the SIR information needed is already available. No matter where the link adaptation decision is made for downlink quality control (in either the mobile station, the RNC or the base station), link adaptation decisions (as opposed to the information used to make the decisions) are signaled to the base station (unless the base station makes the decisions, in which case the decisions are known to the base station) so that the base station will change its MCS accordingly. The particular changes the base station is to make to the coding/modulation level when any one or more of the above events occur are not the subject of the invention.

In the foregoing description, it has been assumed that the outer loop power control is made for a shared packet channel (i.e. the downlink shared channel DSCH or the high speed downlink shared channel HS-DSCH) (i.e. the quality control is for a shared packet channel), based on quality indicators derived from signaling over the shared packet channel. The same decisions (for the same shared packet channel) can also be made based on the associated dedicated channel DCH. (The associated DCH is an ordinary dedicated transport channel; it is power-controlled using closed loop power control, both the fast closed loop and the slower outer loop and may be in soft handover with several base stations or sectors.) Then the commands issued by the outer loop power control for controlling the associated DCH are used for making link adaptation decisions for the shared channel.

Instead of successive SIR target increase or decrease commands, a link adaptation decision could be based on a function that generates some other increase (up) or decrease (down) signal quality indicators. If several up-indicators are generated successively, a more robust MCS would be selected. If several down-indicators are generated in succession, a higher bit rate could be used. For example, an up-indicator would be generated whenever an erroneous frame is received, and a down-indicator would be generated whenever a correctly received frame is received. Naturally, more intelligent logic could also be used as events 3 and 4 above.

In one such alternative embodiment, for downlink quality control the coding/modulation level decided on in making a link adaptation can be based on acknowledgement/negative acknowledgement (ACK/NACK) signals generated by the mobile station upon receiving the downlink signal transmitted by the base station. The modules for determining what link adaptation the base station should make can be implemented in either the mobile, the base station, or the RNC.

According to an embodiment based on ACK/NACK signaling by the mobile for downlink signal quality control, if a packet is not correctly received, the quality of the downlink is poor and the coding/modulation level should be adjusted to compensate the poor signal conditions. Preferably, instead of making decisions based on only the most recent ACK/NACK, the BS or the RNC makes link adaptation decisions based on several most recent ACK/NACK messages. For example, if certain fraction of recent ACK/NACK commands were NACK commands, the mobile would use a more robust (lower bit rate) MCS. Conversely, if a certain fraction (not necessarily same as above) of recent ACK/NACK commands were ACK commands, an MCS providing a higher bit rate would be selected. Alternatively a more robust MCS would be selected if a certain number of successive NACK commands are issued, and a higher data rate MCS would be selected if a certain number of successive ACK commands are issued.

Figure 2:
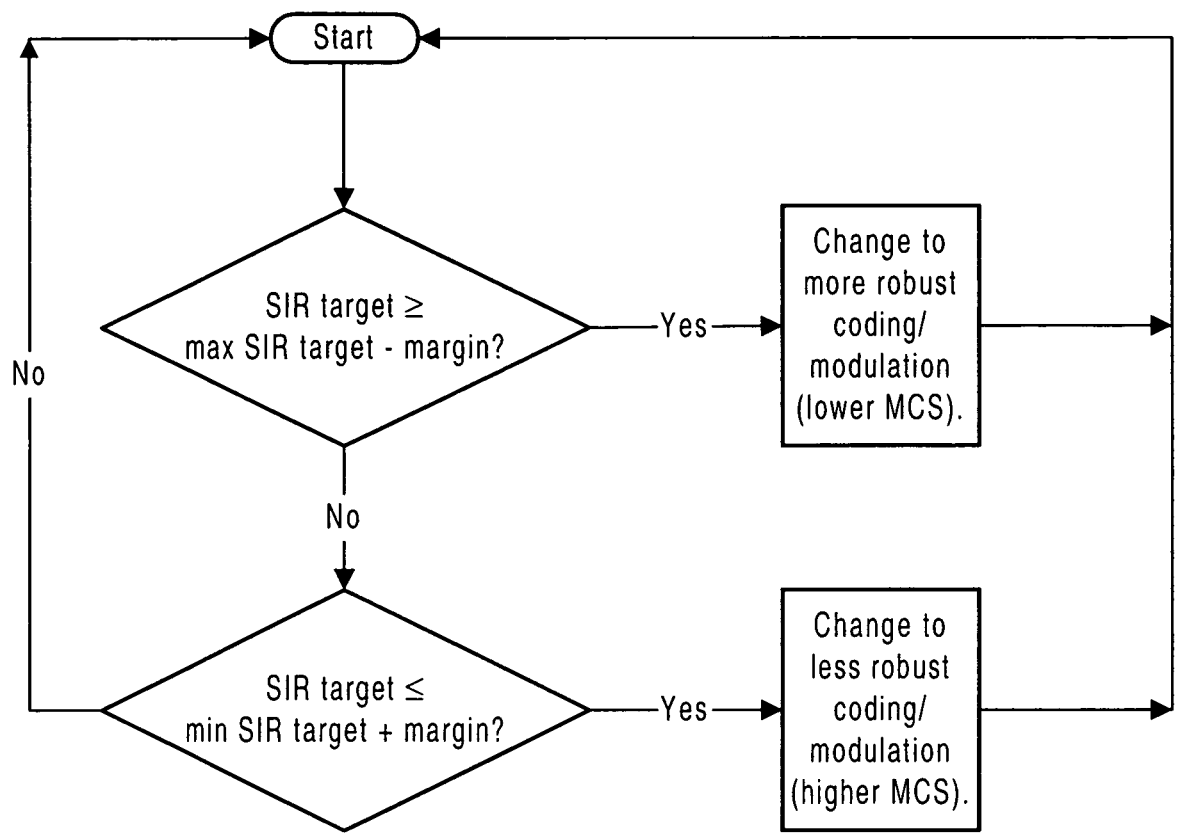
FIG. 2 is a flow chart for one decision process according to the invention used to determine whether to perform link adaptation.

Of course there is a corresponding embodiment based on ACK/NACK signaling by the base station for uplink signal quality control. Referring now to FIG. 2, the decision process used to determine whether or not to perform link adaptation is shown where the decision is made based on the first two events described above, i.e. whether the SIR target provided by the outer-loop power control has reached a predetermined maximum or is close to a predetermined maximum (within some predetermined margin), so that more robust modulation and/or stronger coding is needed. If the SIR target reaches or is near a minimum predetermined SIR target, then link adaptation is performed in which less robust modulation and/or weaker coding is used, which would provide a higher data rate.

Figure 3:
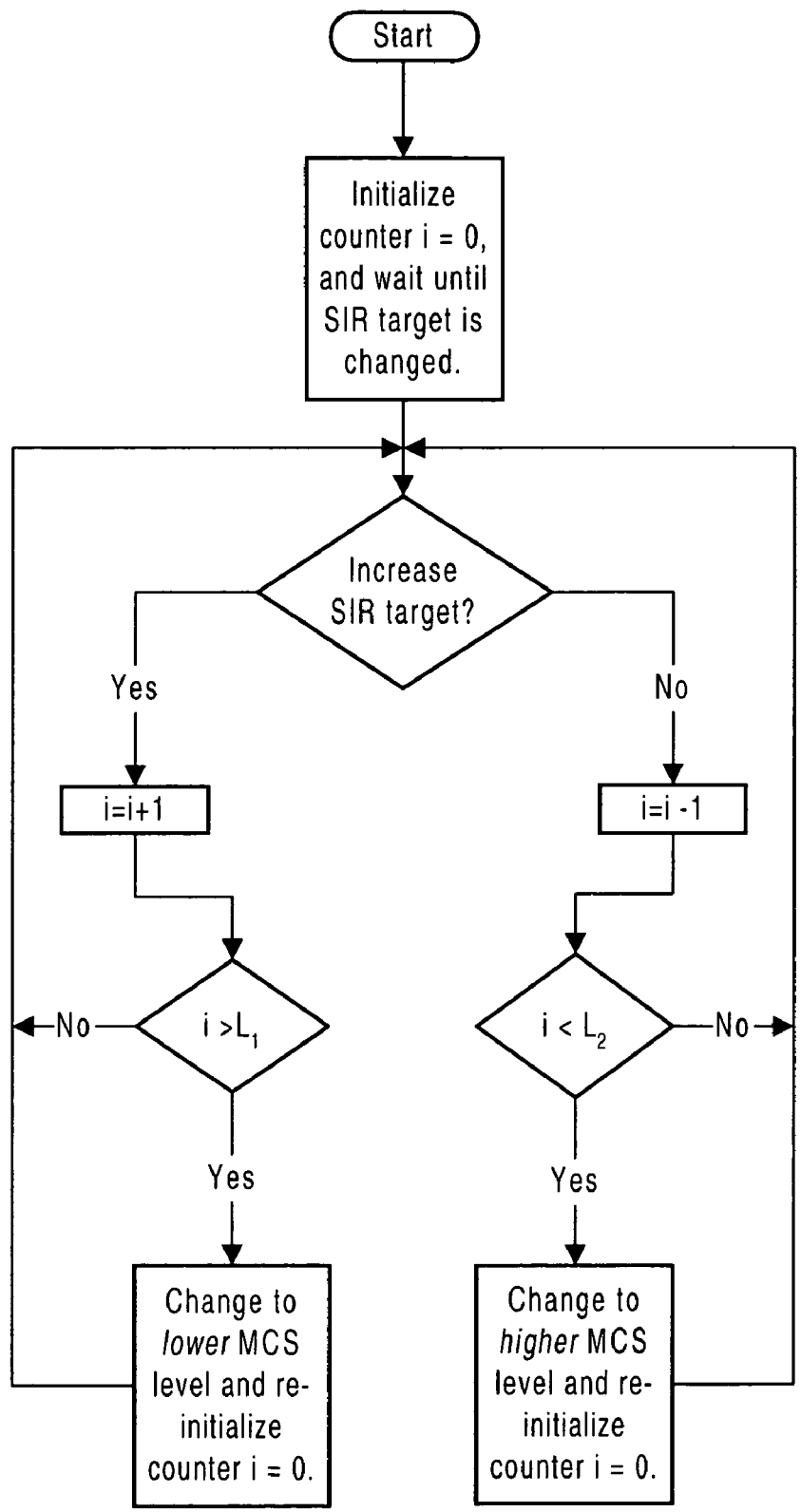
FIG. 3 is a flow chart for a second decision process according to the invention used to determine whether to perform link adaptation.

Referring now to FIG. 3, the decision process used to determine whether or not to perform link adaptation is shown where the decision is made based on the third event described above, i.e. whether there have been a number of consecutive SIR target changes (or up/down quality indicator commands) provided by the outer-loop power control, or a number of consecutive ACK/NACK signals (which can also be considered an up/down quality indicator command), in either the up direction (or NACK signals) or down direction (or ACK signals) in excess of some predetermined limit L1 (for up commands or NACK signals) or L2 (for down commands or ACK signals).

Figure 4:
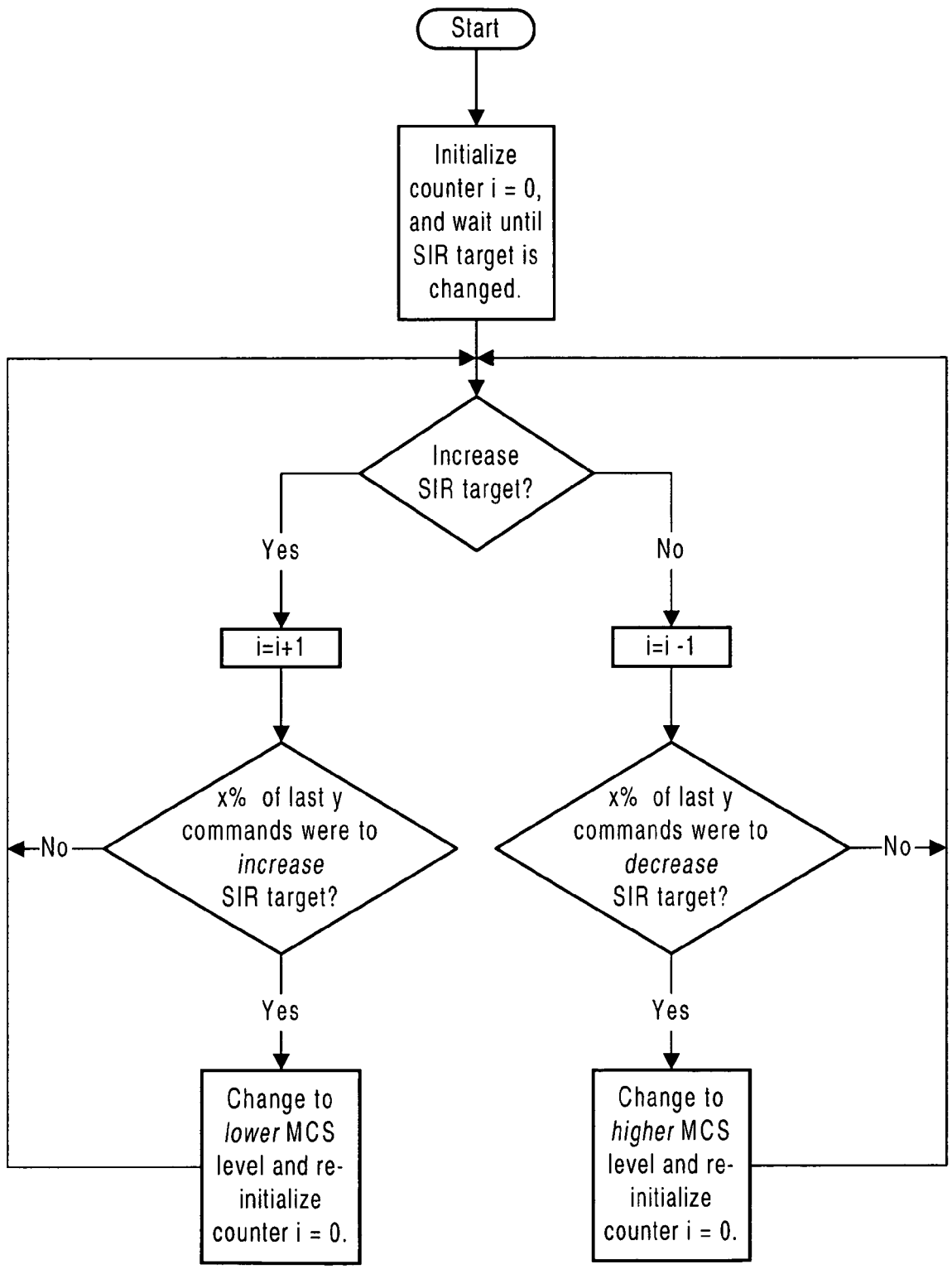
FIG. 4 is a flow chart for a third decision process according to the invention used to determine whether to perform link adaptation.

Referring now to FIG. 4, the decision process used to determine whether or not to perform link adaptation is shown where the decision is made based on the fourth event described above, i.e. whether there has been a high enough percentage of some previous number of SIR target changes in either the up or down direction (or a high enough percentage of either ACK or NACK signals).

It should be understood that in the preferred embodiment, any of the above-described events are used to trigger a decision to do link adaptation, but the invention also comprehends basing such a decision on any one or any combination of the decision processes illustrated in FIGS. 2 through 4.

In addition, as mentioned above and as should be clear from the above description, although a fast power control loop (the so-called inner loop) is shown and described (in FIG. 1), the invention in no way makes use of a fast power control loop. The invention makes use only of either SIR target increase or decrease commands (provided by the outer loop, also called the slow power control loop), or ACK/NACK signaling.

FIGS. 5-8 illustrate different embodiments of the invention for quality control of a downlink signal in respect to where link adaptation decisions are made, and where the other modules can be located used in embodiments relying on an outer power loop.

Figure 5:
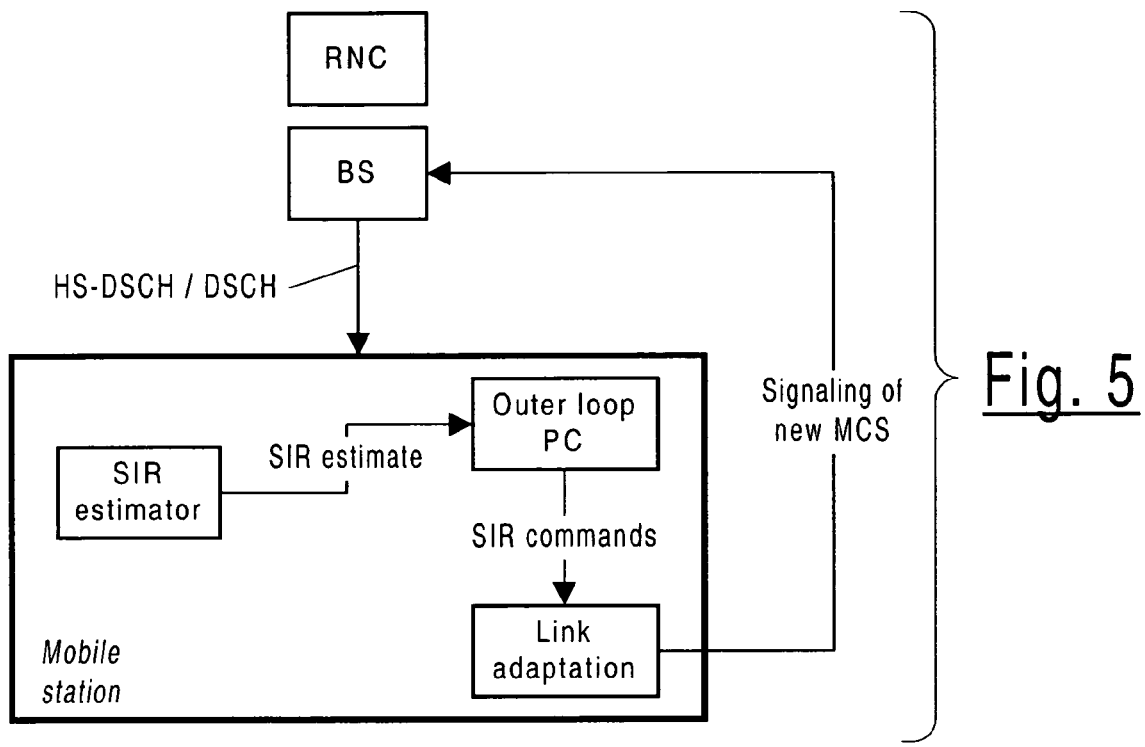
FIG. 5 is block diagram/flow diagram showing signal quality control according to an embodiment in which SIR estimation, outer loop power control, and link adaptation decisions are all performed in the mobile station.

Referring now to FIG. 5, signal quality control is shown according to an embodiment in which SIR estimation, outer loop power control, and link adaptation decisions are all performed in the mobile station.

Figure 6:
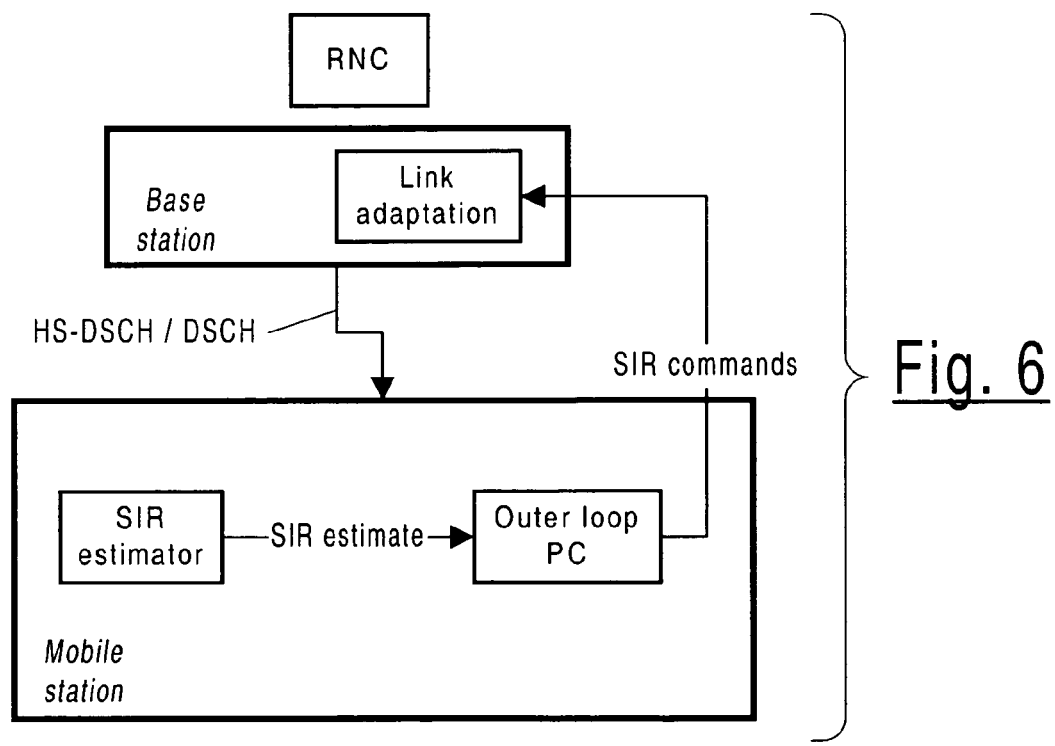
FIG. 6 is block diagram/flow diagram showing signal quality control according to an embodiment in which SIR estimation and outer loop power control are performed in the mobile station, and link adaptation decisions are made in the base station.

Referring now to FIG. 6, signal quality control is shown according to an embodiment in which SIR estimation and outer loop power control are performed in the mobile station, and link adaptation decisions are made in the base station.

Figure 7:
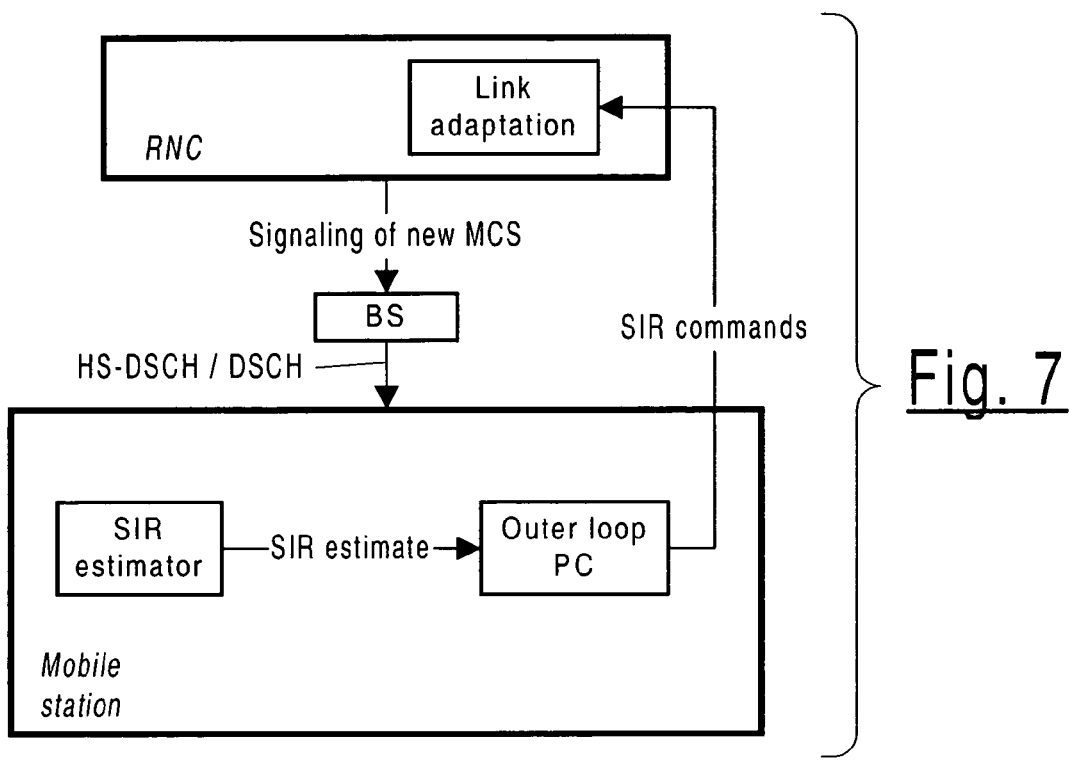
FIG. 7 is block diagram/flow diagram showing signal quality control according to an embodiment in which SIR estimation and outer loop power control are performed in the mobile station, and link adaptation decisions are made in a radio network controller (RNC)

Referring now to FIG. 7, signal quality control is shown according to an embodiment in which SIR estimation and outer loop power control are performed in the mobile station, and link adaptation decisions are made in the RNC.

Figure 8:
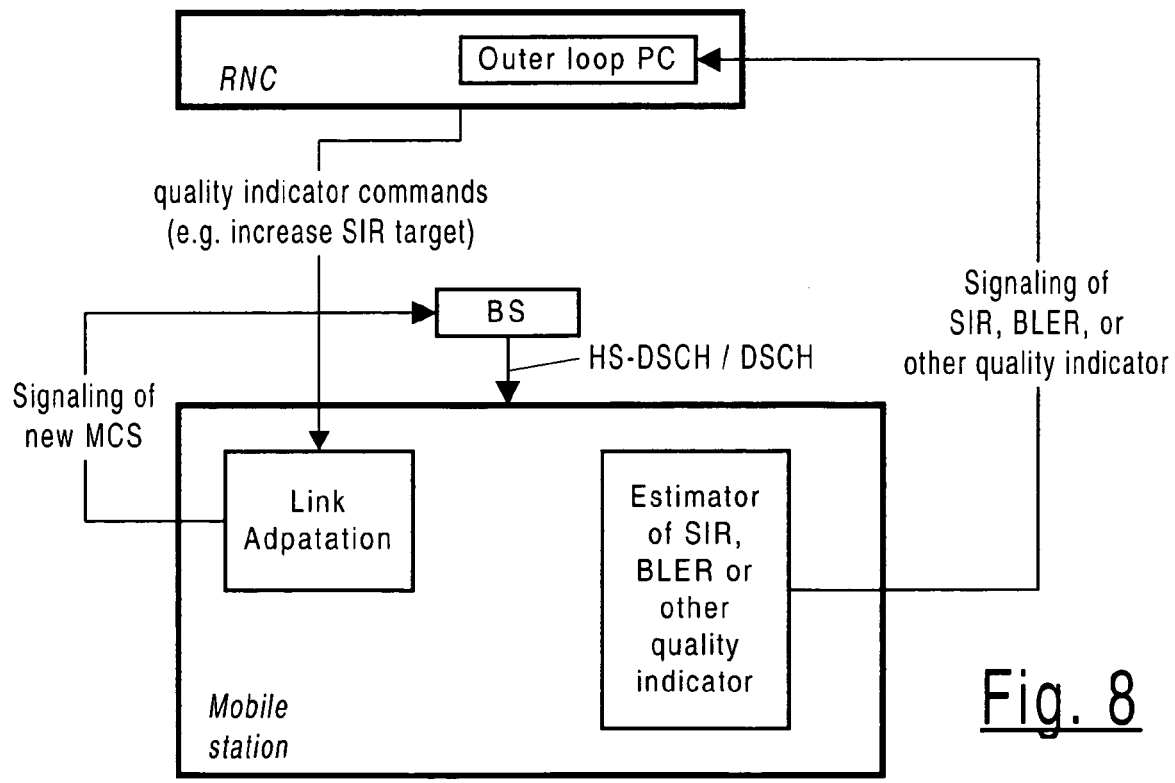
FIG. 8 is block diagram/flow diagram showing signal quality control according to an embodiment in which SIR estimation or BLER or BER monitoring is performed in the mobile station, and outer loop power control is made in the RNC or base station, and link adaptation decisions are made in the mobile station.

Referring now to FIG. 8, signal quality control is shown according to an embodiment in which SIR estimation or BLER or BER monitoring is performed in the mobile station, outer loop power control is made in the RNC or base station, and link adaptation decisions are made in the mobile station. It should be appreciated that the link adaptation module could just as well be located in the RNC or the base station, instead of in the mobile station as shown in FIG. 8.

In some embodiments of the invention, the link adaptation algorithm could use a frame error rate (FER) or block error rate (BLER) or corresponding statistic collected over a predetermined time period (e.g. the statistics could be collected block-wise or could be collected using a sliding window). An appropriate MCS would then be selected based on the measured statistics. Thus, if the measured FER/BLER is above a predetermined target FER/BLER, then a more robust MCS would be selected, and conversely, if the measured FER/BLER is below a predetermined target, a less robust MCS would be selected. Preferably there is only a single target, i.e. one target which is such that if the statistic is less than the target, a less robust MCS is used, and if the statistic is greater than the same target, a more robust MCS is used.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for use by a second communication device, comprising:
   examining a signal received from a first communication device and so providing a first indication of the quality of the signal;
   obtaining a second indication of the quality of the signal based at least on the first indication of the quality of the signal in an outer loop power control process; and
   deciding whether to perform link adaptation based on the first indication and second indication of the quality of the signal.

2. The method of claim 1, wherein the first indication of the quality of the signal is either a signal to interference ratio estimate, or a frame error rate or a block error rate or corresponding statistic collected over a predetermined time period.

3. The method of claim 1, wherein the second indication of the quality of the signal is either a signal to interference ratio target value, or a changed signal to interference ratio target value.

4. The method of claim 3, wherein the decision to perform link adaptation is based on whether the signal to interference ratio target is to be changed to a value that is within some predetermined margin of a predetermined maximum or minimum signal to interference ratio target.

5. The method of claim 3, wherein a succession of signal to interference ratio target change commands are recorded, and further wherein the decision to perform link adaptation is based on whether a predetermined number of consecutive signal to interference ratio target change commands are all either to increase the signal to interference ratio target or to decrease the signal to interference ratio target.

6. The method of claim 3, wherein a succession of signal to interference ratio target change commands are recorded, and further wherein the decision to perform link adaptation is based on whether a predetermined fraction of a predetermined number of the signal to interference ratio target change commands are either to increase the signal to interference ratio target or to decrease the signal to interference ratio target.

7. The method of claim 1, wherein the first communication device is selected from the group consisting of a mobile station and a base station.

8. The method of claim 1, wherein the signal for which the first indication of quality is provided is different from, but associated with, the signal for which the link adaptation decision is made.

9. The method of claim 1, wherein the link adaptation decision is based on a succession of signal quality indicators provided by a function that generates an increase or decrease in signal quality indicator depending on whether or not a frame is correctly received.

10. An apparatus, comprising:
    means for examining a signal received from a first communication device and so providing a first indication of the quality of the signal;
    means for obtaining a second indication of the quality of the signal based at least on the first indication of the quality of the signal in an outer loop power control process; and
    means for deciding whether to perform link adaptation based on the first indication and second indication of the quality of the signal.

11. An apparatus, comprising:
    a quality estimator, for examining a signal received from a first communication device and so providing a first indication of the quality of the signal;
    a link adaptation element, for obtaining a second indication of the quality of the signal based at least on the first indication of the quality of the signal in an outer loop power control process, and for deciding whether to perform link adaptation based on the first indication and second indication of the quality of the signal.

12. A system, comprising:
    a quality estimator, for examining a signal received from a first communication device and so providing a first indication of the quality of the signal as received by a second communication device;
    an outer loop power control element, for providing a second indication of the quality of the signal based at least on the first indicator of the quality of the signal in an outer loop power control process; and
    a link adaptation element, for deciding whether to perform link adaptation based on the first indication and second indication of the quality of the signal.

13. A method, comprising:
    examining a signal received from a first communication device and so providing a first indication of the quality of the signal as received by a second communication device;
    obtaining a second indication of the quality of the signal based on an outer loop power control process; and
    deciding to perform link adaptation based on the first and second indication of the quality of the signal;
    wherein the second indication of the quality of the signal as received by the second communication device is either a signal to interference ratio target value or a changed signal to interference ratio target value;
    and further either:

wherein a succession of signal to interference ratio target change commands are recorded, and wherein the decision to perform link adaptation is based on whether a predetermined number or predetermined fraction of a predetermined number of the signal to interference ratio target change commands are either to increase the signal to interference ratio target or to decrease the signal to interference ratio target, or wherein the decision to perform link adaptation is based on whether the signal to interference ratio target is to be changed to a value that is within some predetermined margin of a predetermined maximum or minimum signal to interference ratio target.

14. A system, comprising:

a quality estimator, for examining a signal received from a first communication device and so providing a first indication of the quality of the signal as received by a second communication device;

an outer loop power control element, for providing a second indication of the quality of the signal based on an outer loop power control process; and a link adaptation element, for deciding to perform link adaptation based on the first and second indication of the quality of the signal;

wherein the second indication of the quality of the signal as received by the second communication device is either a signal to interference ratio target value or a changed signal to interference ratio target value;

and further either:

wherein a succession of signal to interference ratio target change commands are recorded, and wherein the decision to perform link adaptation is based on whether a predetermined number or predetermined fraction of a predetermined number of the signal to interference ratio target change commands are either to increase the signal to interference ratio target or to decrease the signal to interference ratio target, or wherein the decision to perform link adaptation is based on whether the signal to interference ratio target is to be changed to a value that is within some predetermined margin of a predetermined maximum or minimum signal to interference ratio target.

\* \* \* \* \*

UNITED STATES PATENT AND TRADEMARK OFFICE
CERTIFICATE OF CORRECTION

PATENT NO.       : 7,664,047 B2                                    Page 1 of 1
APPLICATION NO.  : 11/399291
DATED            : February 16, 2010
INVENTOR(S)      : Seppo O. Hämäläinen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Twenty-eighth Day of December, 2010

David J. Kappos
*Director of the United States Patent and Trademark Office*